United States Patent
Stefan et al.

(10) Patent No.: US 9,582,998 B2
(45) Date of Patent: Feb. 28, 2017

(54) METHOD AND APPARATUS FOR AUTONOMOUS MOVEMENT OF A PARKED MOTOR VEHICLE

(71) Applicant: Ford Global Technologies, LLC, Dearborn, MI (US)

(72) Inventors: Frederic Stefan, Aachen, NRW (DE); Uwe Gussen, Huertgenwald, NRW (DE); Erik Alpman, Aachen, NRW (DE); Christoph Arndt, Rheinland-Pfalz (DE)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 14/450,496

(22) Filed: Aug. 4, 2014

(65) Prior Publication Data

US 2015/0039213 A1    Feb. 5, 2015

(30) Foreign Application Priority Data

Aug. 2, 2013   (DE) ................. 10 2013 215 260

(51) Int. Cl.
  *G08G 1/00*   (2006.01)
  *B62D 15/02*  (2006.01)

(52) U.S. Cl.
  CPC ............. *G08G 1/00* (2013.01); *B62D 15/0285* (2013.01)

(58) Field of Classification Search
  CPC ....... B60W 30/06; G08G 1/00; B62D 15/0285
  See application file for complete search history.

(56) References Cited

U.S. PATENT DOCUMENTS

2015/0039173 A1* 2/2015 Beaurepaire et al. .......... 701/23

FOREIGN PATENT DOCUMENTS

DE    102009057647 A1    6/2011

* cited by examiner

*Primary Examiner* — Basil T Jos
(74) *Attorney, Agent, or Firm* — Frank A. MacKenzie; Brooks Kushman P.C.

(57) ABSTRACT

A method and an apparatus for autonomous movement of a parked motor vehicle out of a parking space in which it is blocking an entranceway to a facility such as private driveway. A method has the following steps: is parked in a blocking position blocking relative to an entranceway, detecting that a second vehicle requires passage through the entranceway, and operating a parking assistance system to autonomously remove the vehicle from the blocking position to permit passage of the second vehicle. The parking assistance system returns the vehicle to the original parking position after passage of the second vehicle through the entranceway is complete. The requirement for a second vehicle to pass through the entranceway may be detected using wireless vehicle-to-vehicle communication, or using a remote sensing system on-board the vehicle to detect the second vehicle.

11 Claims, 5 Drawing Sheets

METHOD AND APPARATUS FOR AUTONOMOUS MOVEMENT OF A PARKED MOTOR VEHICLE

CROSS-REFERENCE TO RELATED APPLICATIONS

This application claims foreign priority benefits under 35 U.S.C. §119(a)-(d) to DE 10 2013 215 260.4 filed Aug. 2, 2013, which is hereby incorporated by reference in its entirety.

TECHNICAL FIELD

The invention relates to a method and an apparatus for autonomous movement of a parked motor vehicle. In particular, the invention relates to a method and an apparatus for moving a parked motor vehicle to permit improved utilization of existing parking space.

BACKGROUND

The provision of parking space, in particular in city centers, constitutes an increasing challenge. At specific busy times the number of available parking spaces is frequently not sufficient, wherein the time wasted by road users to find a suitable parking place entails considerable stress, additional air pollution and the waste of energy and fuel. On the other hand, the respective city administration only has a limited area available as parking space and is often subjected to ever higher costs to provide new parking places.

When roads within a city center are considered more closely it can frequently be found that some locations are never used as a parking place because, for example, parking is prohibited owing to regulations and laws. These include, for example, locations which form the access to a facility such as, for example, a private garage, a large door of a building, a fire service entrance etc. Such locations are often identifiable for road users by the curbs at these locations being lowered to permit better access for vehicles. Such locations are referred to here and below as entranceway parking places (EPP). If a third person were to park their vehicle there, the entranceway to the respective facility would therefore be blocked for other road users. If someone parks, for example, before the entrance to a private garage, the garage owner is no longer able to park his vehicle therein or remove his vehicle therefrom and under certain circumstances informs the police.

DE 10 2009 057 647 A1 discloses, inter alia, a method and an apparatus for arranging waiting positions for at least two motor vehicles, one of the motor vehicles having an interface for communicating with another motor vehicle which has another corresponding interface. In addition, in the respective motor vehicle a unit is provided for autonomously maneuvering the motor vehicle. In reaction to the reception of, for example, a request of the other motor vehicle for parking at the location or removal from the location via the interface, a maneuver is carried out as a function of the maneuvering request, and therefore a contribution to cooperative optimization of a parking space is made.

SUMMARY

An object of the present invention is to make available a method and a system for operating a motor vehicle which permit improved utilization of the existing parking space.

A method for operating a motor vehicle, the motor vehicle having a parking assistance module for autonomously carrying out a maneuver for parking a motor vehicle at a location or removing said motor vehicle from said location has the following steps:
   determining whether the motor vehicle is blocking an entranceway;
   monitoring whether passage through the entranceway is required by another motor vehicle, and
   automatically removing the motor vehicle from the blocking location in the case of detected required passage through the entranceway.

The present invention is based in particular, on the concept of advantageously allowing parking of a vehicle in a position that constitutes an entranceway parking place (EPP) that is in principle "prohibited" for use as a parking space, without this use involving disadvantages or impairments for other road users. If a vehicle is parked in the vicinity of such an entranceway parking place, the apparatus according to the invention monitors, from the respective vehicle, whether another vehicle has to use the respective location as an entranceway. If this is the case, the parked vehicle autonomously and automatically carries out a maneuver for removing said vehicle from the location in order to clear the entranceway to the respective facility behind the entranceway parking place. As soon as the other vehicle has passed the entranceway parking place and access is no longer required, the parked vehicle can then carry out again an automatic maneuver for parking at said location in order to return to its original parked position.

According to one embodiment, the method also has the step of automatically re-parking the motor vehicle at the location after the use of this location as an entranceway by the other motor vehicle is terminated.

According to one embodiment, the step of determining whether the motor vehicle is blocking an entranceway comprises camera-assisted or sensor-assisted detection of the surroundings of the motor vehicle.

According to one embodiment, in the case of evidence of blocking of an entranceway, the owner of the motor vehicle is informed automatically.

According to one embodiment, the step of monitoring whether current use of the entranceway is intended by another motor vehicle comprises wireless communication from motor vehicle to motor vehicle.

According to one embodiment, the step of monitoring whether current use of the entranceway is intended by another motor vehicle comprises camera-assisted or sensor-assisted monitoring of other motor vehicles approaching the motor vehicle.

Furthermore, the invention also relates to an apparatus for operating a motor vehicle, the motor vehicle having a parking assistance module for autonomously carrying out a maneuver for parking a motor vehicle at a location or removing said motor vehicle from said location, wherein the apparatus is configured to carry out a method having the features described above.

Further refinements of the invention can be found in the description and the dependent claims.

The invention will be explained below on the basis of an exemplary embodiment and with reference to the appended figures, of which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The design of an apparatus according to the invention and a typical sequence of the method according to the invention are explained in an embodiment below with reference to the schematic overview diagram in FIG. 1 and the flowchart in FIG. 2.

Figure 1:
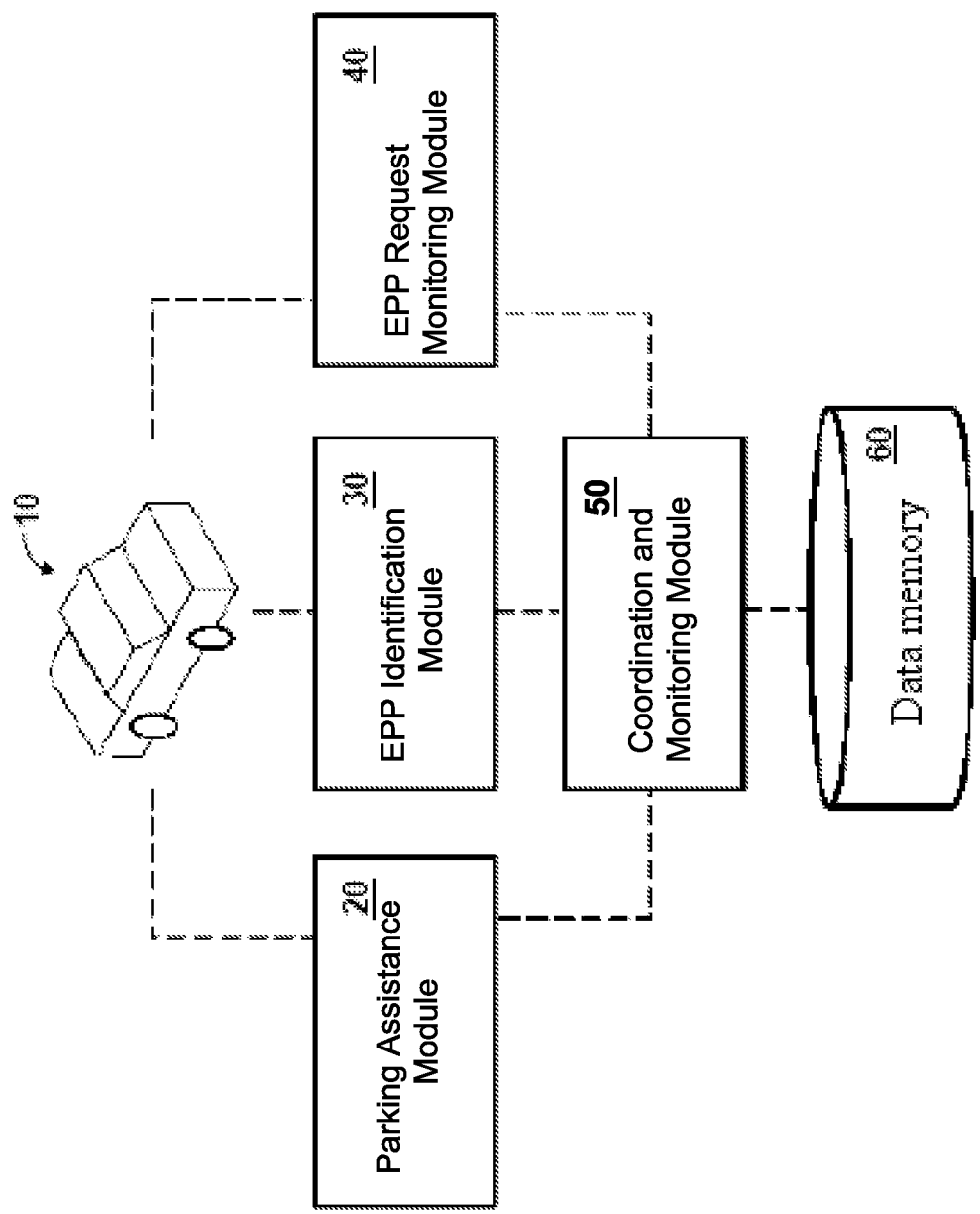
FIG. 1 shows a schematic diagram explaining the design of an apparatus according to the invention in an exemplary embodiment.

In FIG. 1, "10" denotes a vehicle which is equipped with the apparatus according to the invention. An autonomous parking assistance module 20 serves to carry out maneuvers for removing a vehicle from a location and parking said vehicle at a location whenever another road user needs to pass through the respective entranceway parking place (EPP). Such an parking assistance module 20 is preferably capable, on the one hand, of taking over control of the lateral movement of the vehicle (i.e. the steering of the steering wheel) and, moreover, also the control of the longitudinal movement, (i.e. the control of the accelerator pedal and transmission) of the vehicle without the driver or with the driver being located on board.

If the vehicle is parked at an EPP, an EPP identification module 30 is informed of this. The identification of an EPP can serve as a trigger signal for activating the apparatus according to the invention and can take place in various ways. According to one exemplary embodiment, the driver can activate the module manually when he parks at an EPP. In further automated embodiments, the EPP can be identified on the basis of navigation data and GPS. Furthermore, the EPP can also be identified by detecting and analyzing the shape of the curb using a remote sensing system, utilizing sensors such as radar or camera sensors (if appropriate by using image process algorithms). In addition, the road structure can also be analyzed by using image processing algorithms, in order to identify certain roadway or sidewalk configurations which are frequently present in the case of an EPP.

An EPP access request monitoring module 40 serves to monitor any approaching traffic and, in particular, to determine whether any other vehicle is dependent on using the entranceway adjacent to the EPP.

The detection of an entrance request of another vehicle can be carried out in different ways: in one embodiment, the entrance request can be implemented in the form of a wireless data exchange between the vehicle requesting entry via the EPP and the parked vehicle (for example via communication from vehicle to vehicle). This refinement is advantageous in so far as it permits early detection of the entry request and any waiting time for the vehicle requesting the entry to the EPP is avoided. In addition, the parked vehicle therefore has more time to carry out the maneuver for removal from the parking space. This refinement is therefore advantageous, in particular, in the case of an entry request by fire service vehicles since they require immediate access, for example to a burning building.

In further embodiments, an entry request can also be detected by using sensors which monitor the approaching vehicles and interpret the behavior of these vehicles, for example, as an entry request. In this context it is possible, for example, for the detection of the owner of a parking place to be implemented by detecting a license place or motor vehicle identification if the corresponding data are available from a database. Furthermore, vehicles which slow down and stop in the direct vicinity (for example switch on their flashing indicator lights in order to indicate the intention to travel through the EPP) are monitored with camera assistance and identified on the basis of image processing algorithms.

A central coordination and monitoring module 50 is responsible for coordinating and monitoring the data flow between the modules 20, 30 and 40 described above, the actions described below with reference to the flowchart in FIG. 2 being able to be carried out in particular.

An optional data memory 60 serves to store over a certain time period statistical information and documentation about the maneuvers carried out by the arrangement according to the invention. This information can serve, for example, to determine EPPs in the vicinity of which an extremely high number of entry maneuvers (with a correspondingly high level of expenditure of energy and fuel for a vehicle parked there) are requested. Such EPPs are recommended only for parked vehicles with correspondingly high energy reserves (for example a high state of charge with a battery). The data memory 60 can also be used to inform the owner of the respective parked vehicle how frequently his vehicle has been moved. Furthermore, the information stored in the data memory 60 can also serve for a bonus/credit system for drivers who use an EPP in conjunction with the apparatus according to the invention and as a result contribute indirectly to improving the environment.

Figure 2:
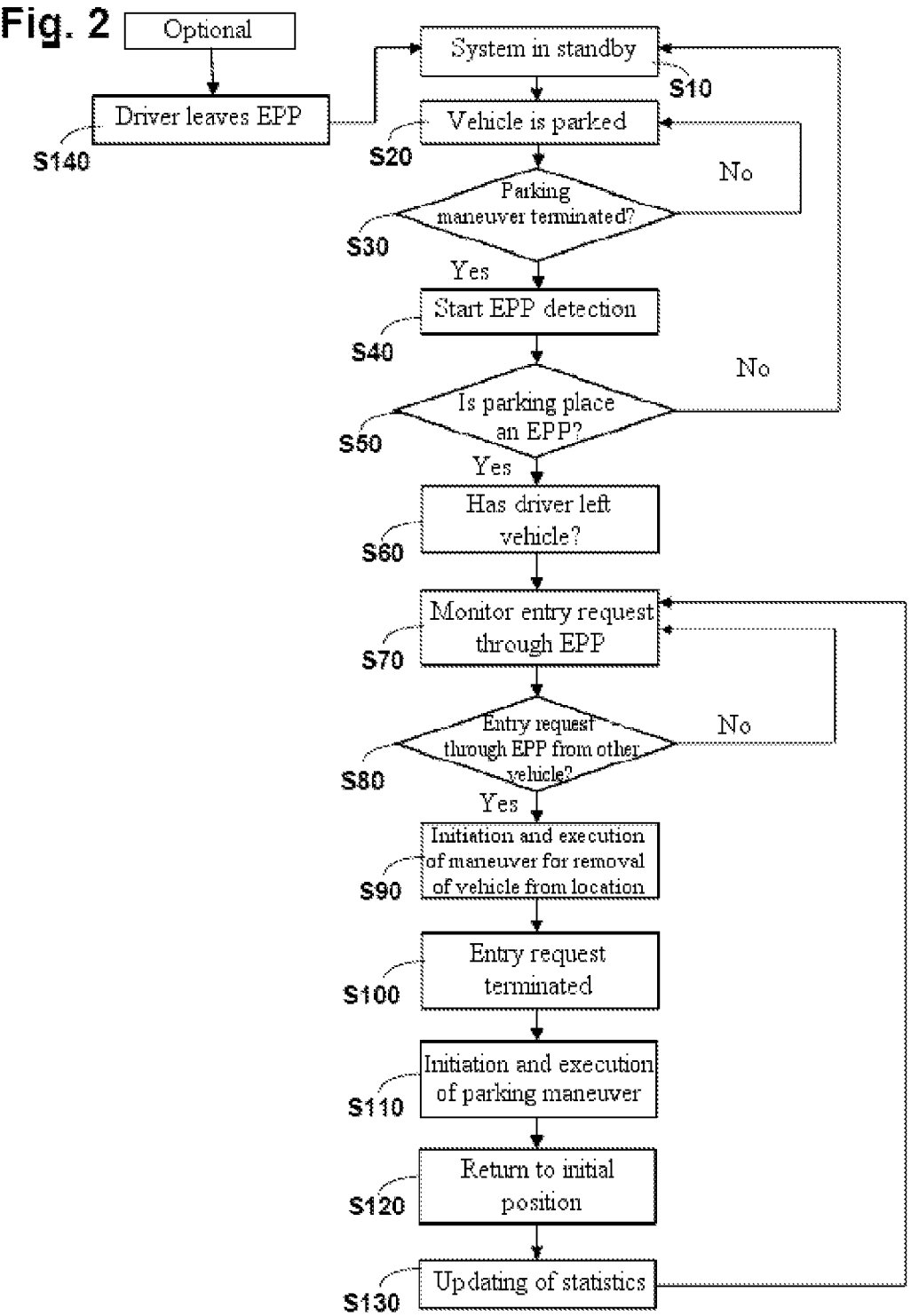
FIG. 2 shows a flowchart explaining a possible sequence of the method according to the invention or the method of functioning of the apparatus from FIG. 1.

The flowchart of FIG. 2 serves to explain an exemplary method of functioning of the apparatus according to the invention.

In the initial state, according to FIG. 2 the apparatus according to the invention is in the standby mode (S10). It is then assumed that the vehicle is carrying out a parking maneuver (S20). As soon as, according to the determination in step S30, the parking maneuver is terminated and the apparatus according to the invention is activated, in step S40 the EPP detection is started. In this context it is determined whether the current parking place is an EPP (i.e. a location which is in principle "prohibited" for use as a parking place) or not. As discussed above, an entranceway is defined as a motor vehicle entrance to any sort of public or private facility. This can take place automatically or else by activation of a pushbutton key by the driver. The driver can be informed in this way that the vehicle is located at an EPP and that an autonomous parking maneuver can be carried out in the absence of the driver.

If, according to the determination in step S50, the parking place is an EPP, in step S70 monitoring for an entry request for entry via the EPP is carried out as soon as the driver has left the vehicle (S60), i.e. it is determined whether incoming vehicles have to drive via the EPP. If this is the case according to the determination in step S80, a maneuver for removal of the vehicle from the EPP is prepared.

Figure 3:
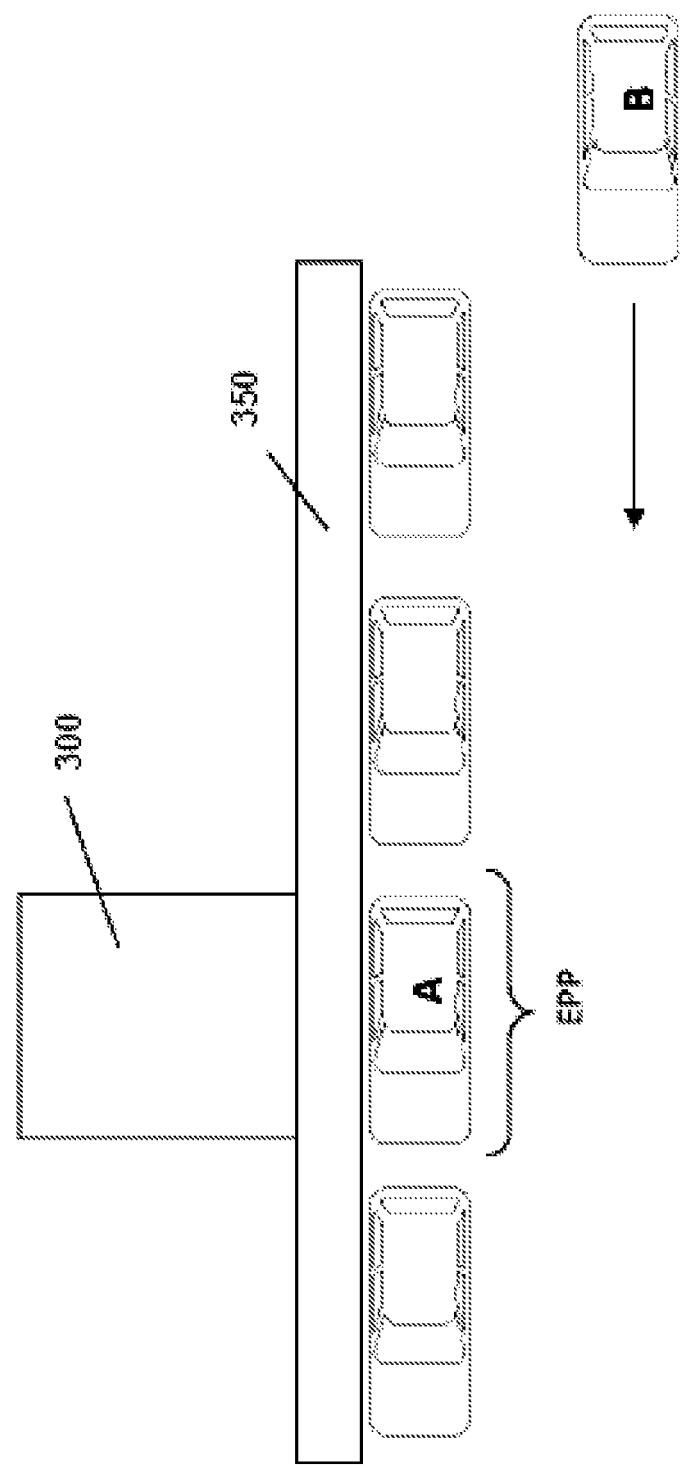
FIGS. 3-5 show schematic diagrams illustrating an embodiment of the method according to the invention.

FIG. 3 shows in this respect a schematic illustration of an example in which a vehicle "A" has just been parked at an EPP. In the example the parking place is therefore an EPP since it is necessary for a vehicle to pass though this location in order to enter the private garage 300 which is located behind the curb 350 in the vicinity of the EPP. A vehicle "B" approaches and wishes to drive into the private garage 300. The vehicle "B" requests entry via the EPP from the vehicle "A".

Subsequently, the parked vehicle must initiate a maneuver for removal ("un-parking") from the location. In the example in FIG. 3, the vehicle "A" activates its parking assistance module to initiate a maneuver for removal from the location. The maneuver for removal from the location should be carried out here (S90) in such a way that the necessary movement of the vehicle is minimized, thereby saving energy and reducing the risk of an accident, other road users are not disrupted and an access area is provided which permits the vehicle "B" to drive into the private garage 300.

Figure 4:
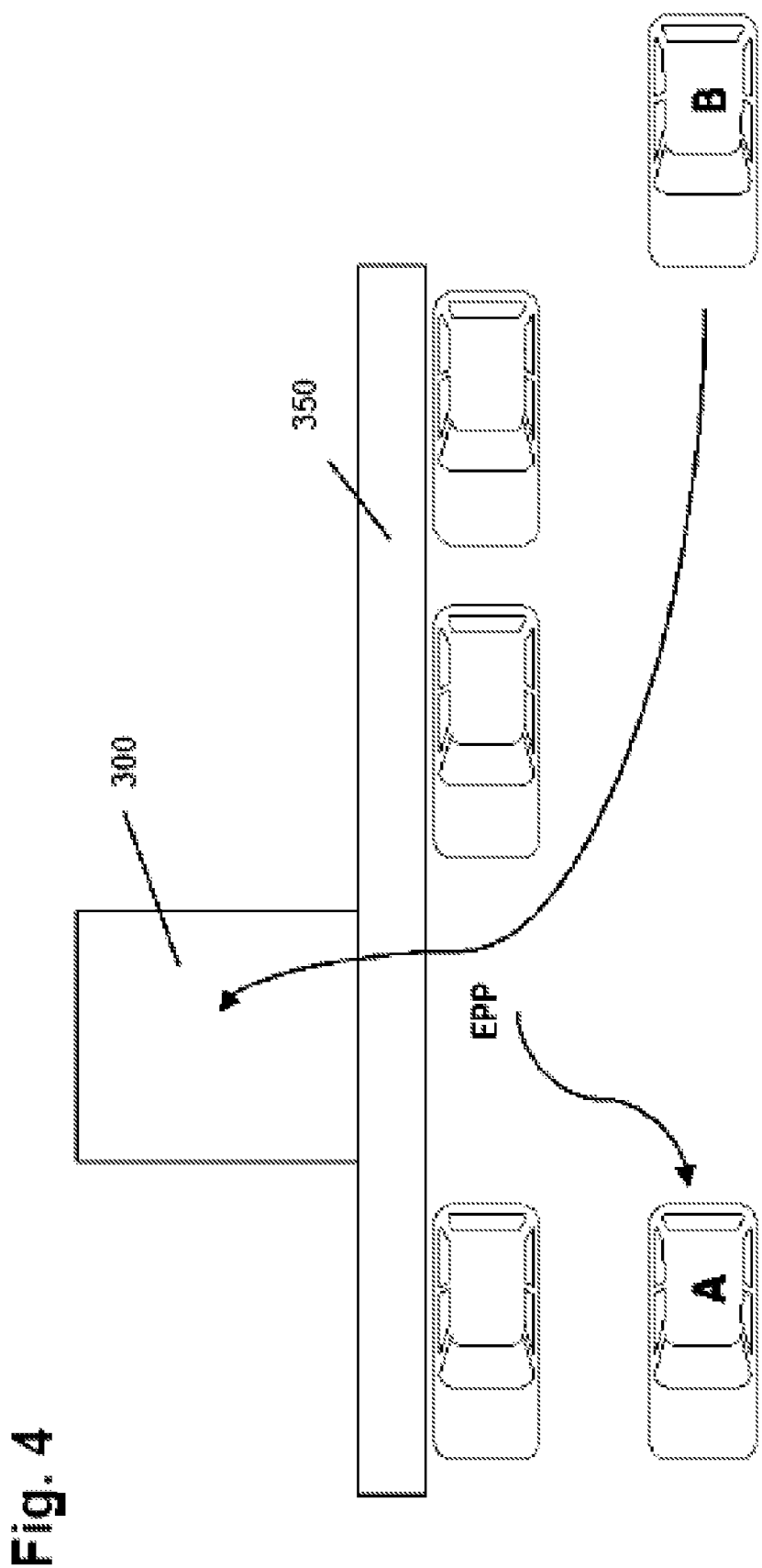

FIG. 4 shows in a merely schematic form the situation which is brought about as soon as the vehicle "A" has moved out of the location. As soon as the entry possibility has been provided, in step S100 the entry request is considered to be terminated. In the present example, according to FIG. 4 the vehicle "B" can then drive into the private garage 300 and park there. As soon as this has taken place, vehicle "A" is informed.

Subsequently, the vehicle "A" which was previously removed from the location in order to provide the entry possibility can return to its original parking place, which can take place by activating the parking assistance module. In the present example, the vehicle "A" can return to the originally occupied access parking place EPP by carrying out a parking maneuver (S110) (step S120).

Figure 5:
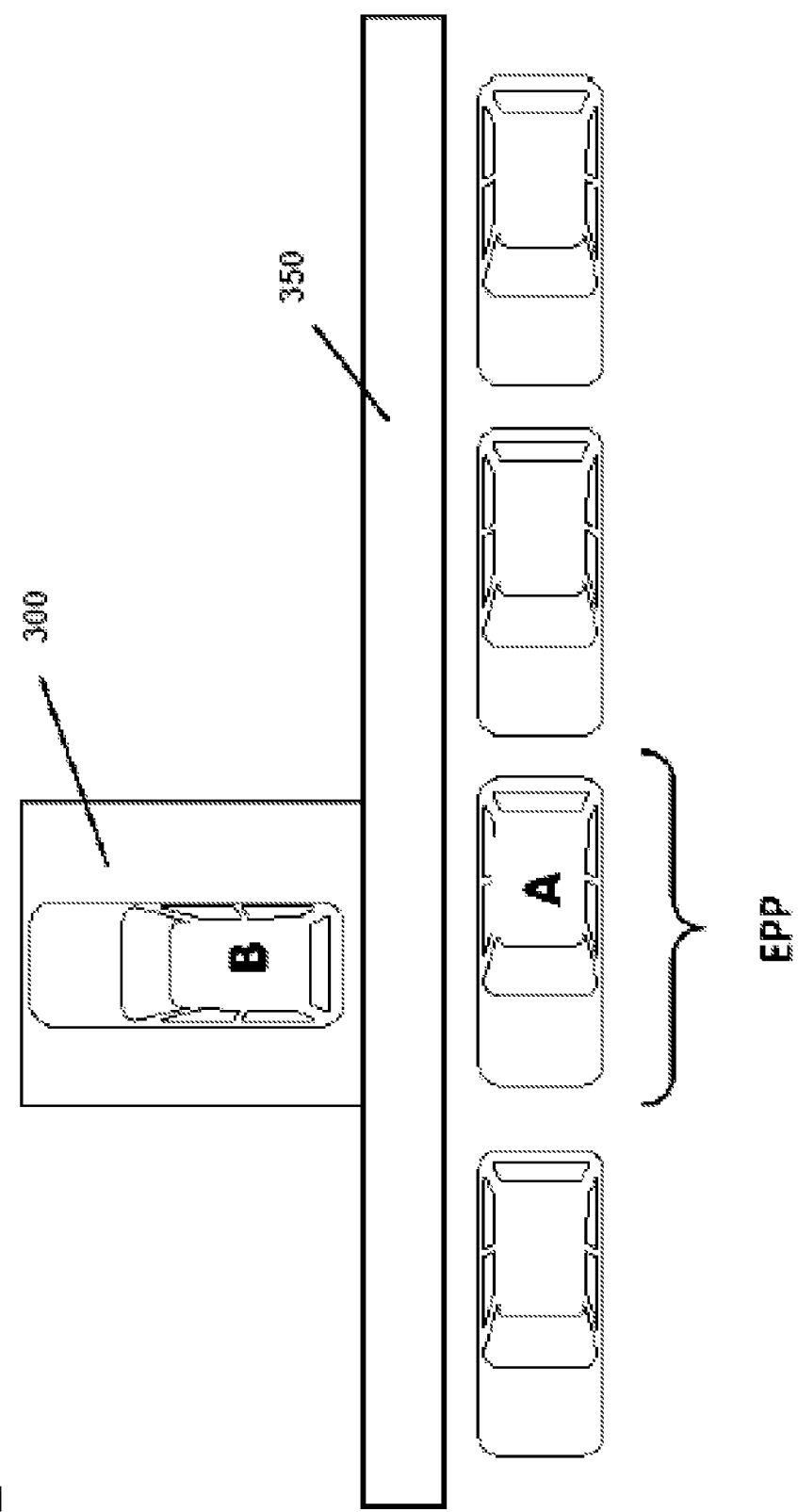

When the vehicle has returned to the EPP, the vehicle "A" is, according to FIG. 5, in its original position (step 120). Furthermore, the vehicle "B" is parked in the private garage 300.

In a subsequent step S130, specific data (for example in conjunction with the steps described above) are stored for statistical purposes. If the driver leaves the EPP at some other time (S140), the method according to the invention ends and the sequence illustrated in FIG. 2 is aborted.

In summary, the present invention makes available a method and an apparatus which improve the availability of parking places by virtue of the fact that locations at which parking is not normally permitted, because as a result the entranceway to some facility (for example a private entry to a garage) would be blocked for other road users, are made available as parking places. The invention includes, in particular, the concept that vehicles which are parked so as to block an entranceway (for example in a garage entrance) are temporarily moved away if another vehicle is dependent on entry to the blocked or "parked-in-front-of" facility (for example garage entrance). As soon as the maneuver is terminated, the vehicle which was previously moved away returns to its original parking place.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating a parking assistance system of a vehicle comprising:
   identifying an entranceway parking place (EPP) where parking is legally prohibited;
   determining that the vehicle is parked in the EPP;
   detecting a second vehicle requiring passage through the EPP; and
   operating the parking assistance system to remove the vehicle from the EPP to permit passage of the second vehicle.

2. The method of claim 1, further comprising:
   operating the parking assistance system to return the vehicle to the EPP after passage of the second vehicle through the EPP is complete.

3. The method of claim 1, wherein the step of determining that the vehicle is in the EPP comprises operating a remote sensing system to detect surroundings of the vehicle.

4. The method of claim 1, further comprising:
   automatically informing an owner of the vehicle that the vehicle has been moved from the EPP.

5. The method of claim 1, wherein the step of detecting that passage through the EPP is required by a second vehicle comprises using wireless vehicle-to-vehicle communication.

6. The method of claim 1, wherein the step of detecting that passage through the EPP is required by a second vehicle comprises using a remote sensing system to detect the second vehicle.

7. The method of claim 6, wherein the remote sensing system is operated to detect that the second vehicle has flashing indicator lights.

8. The method of claim 1, further comprising:
   determining that the second vehicle is permitted to pass through the EPP by detecting an identity of the second vehicle and comparing the identity with a database.

9. A method comprising:
   operating a system onboard a vehicle to determine that the vehicle is parked in an entranceway parking place (EPP) where parking is prohibited by regulation because the EPP obstructs access to an entranceway;
   receiving a wireless signal from a second vehicle indicating that the second vehicle requires passage through the EPP; and
   in response to the wireless signal, automatically operating an autonomous parking assistance system to move the vehicle from the EPP and to return the vehicle to the EPP after the second vehicle completes passage through the EPP.

10. The method of claim 9, wherein the step of determining that the vehicle is in the EPP comprises operating a remote sensing system to detect surroundings of the vehicle.

11. The method of claim 9, further comprising:
    automatically informing an owner of the vehicle that the vehicle has been moved from the EPP.

* * * * *